May 15, 1962  H. J. LAFAYE  3,034,598
TRACTOR-TRAILER BRAKE COMBINATION
Filed July 11, 1960  3 Sheets-Sheet 1

INVENTOR.
HILTON J. LAFAYE
BY
J. B. Holden
ATTORNEY

May 15, 1962 H. J. LAFAYE 3,034,598
TRACTOR-TRAILER BRAKE COMBINATION
Filed July 11, 1960 3 Sheets-Sheet 2

INVENTOR.
HILTON J. LAFAYE
BY
J. B. Holden
ATTORNEY

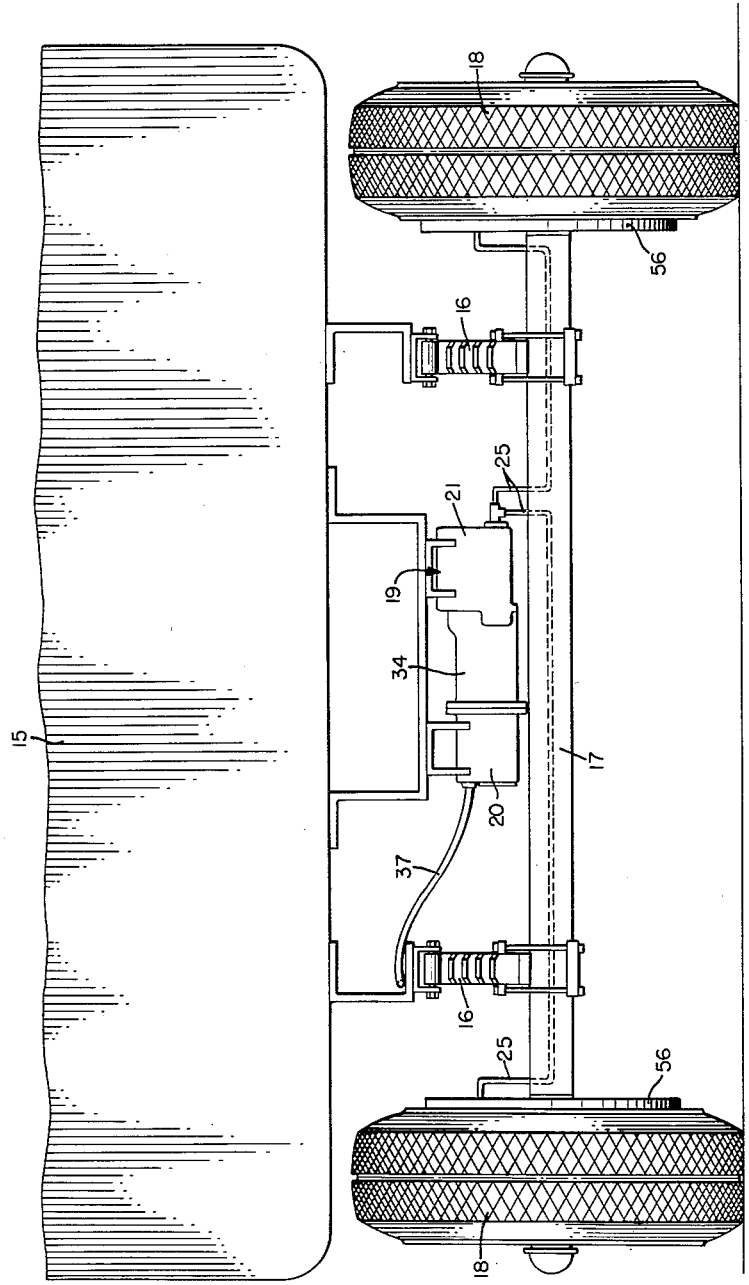

United States Patent Office 3,034,598
Patented May 15, 1962

3,034,598
TRACTOR-TRAILER BRAKE COMBINATION
Hilton J. Lafaye, Akron, Ohio, assignor to The Goodyear Tire & Rubber Company, Akron, Ohio, a corporation of Ohio
Filed July 11, 1960, Ser. No. 42,144
6 Claims. (Cl. 188—3)

This invention relates to tractor-trailer brake combinations, and, more particularly, to such combinations wherein the trailer is a house trailer.

Heretofore, it has been the usual practice to employ electric brakes on a house trailer and to control these brakes by means of a rheostat operated from the towing vehicle. However, such electric brakes are comparatively expensive and often do not supply the force necessary to achieve most effective braking, for example, under emergency conditions.

It has likewise been proposed to utilize on commercial truck trailers or railroad cars hydraulic brakes on the trailing vehicle and operate these brakes from a pressure tank filled with pressure from a pump driven by a rotating wheel or axle, the pressure being valved to the brakes from the tank by an electric valve controlled from the towing vehicle. However, such systems are expensive and space consuming and do not adapt themselves to house trailer brake combinations.

It is the general object of the invention to avoid and overcome the foregoing and other objections to prior art practices by the provision of a relatively inexpensive, lightweight, easily installed, longwearing, high pressure hydraulic brake system for a house trailer in combination with conventional electrical control rheostats in the towing vehicle, the combination providing full range selective pressure control on the hydraulic brakes.

Another object of the invention is to provide an improved house trailer brake combination which can be employed without any change in the existing brake control equipment of towing vehicles.

The foregoing objects of the invention, and other objects which will become apparent as the description proceeds, are achieved by the provision in combination of a towing vehicle, an electric power source on the vehicle, a house trailer connected to the towing vehicle, hydraulic brakes on the house trailer, a master cylinder carried by the house trailer and connected to the hydraulic brakes, a reversible, constant speed electric motor on the house trailer, means connected to and operated by the motor for moving the piston of the master cylinder to and from braking position, electric leads from the towing vehicle to supply electric current from the power source to the motor, solenoid means on the house trailer, a switch element carried on the movable portion of the solenoid means, a rheostat brake control on the towing vehicle, electric leads connecting the power source through the rheostat to the solenoid means whereby the position of the movable portion of the solenoid means and the switch element are controlled by the rheostat, a hydraulic control cylinder connected to the output of the master cylinder, a piston in the control cylinder, a piston rod connected to the piston, a pair of spaced switch members on the piston rod and straddling the switch element, said switch members and element being connected in the electric leads to the motor so that the build-up of pressure in the master cylinder moves the piston in the control cylinder in a direction the same as the action of the movable portion of the solenoid means to thereby connect the motor in forward, stop, or reverse direction in response to the position of the rheostat brake control.

In the drawings, FIG. 1 is a perspective view of the apparatus of the invention and illustrating in association with a towing vehicle and house trailer drawn in phantom line perspective;

FIG. 4 is a front elevation of the house trailer wheel and axle assembly and including the brake control mechanism;

FIG. 6 is a more detailed, but still schematic, showing of the brake control mechanism.

Figure 1:
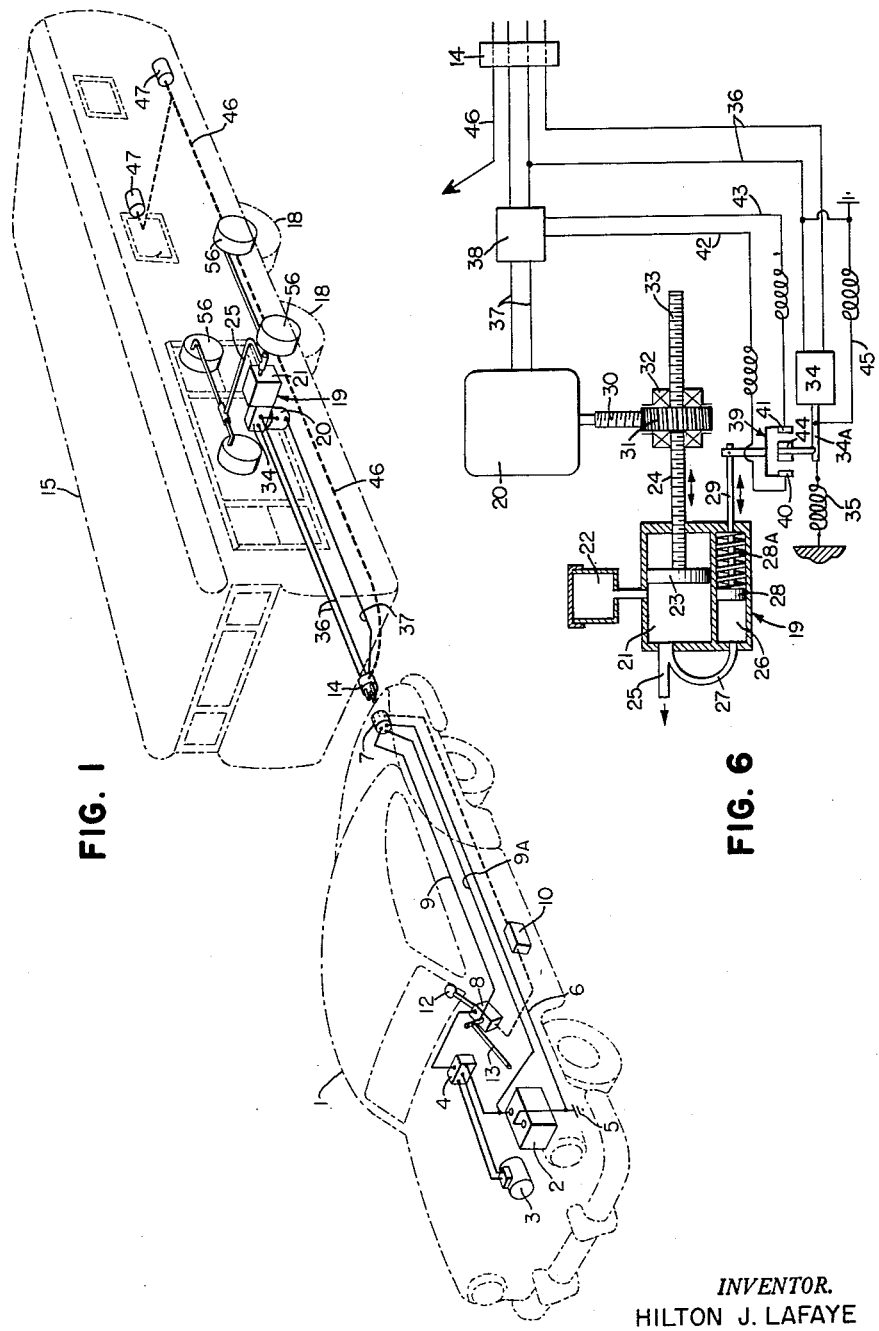
Figure 2:
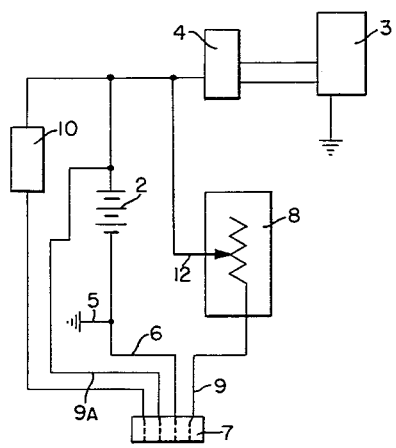
FIG. 2 is a schematic wiring diagram for the tow car brake controls.

Referring to FIGS. 1 and 2, the numeral 1 indicates generally a towing vehicle, such as a car or truck, having a battery 2, a motor driven generator 3 connected through a voltage regulator 4 to the battery. One side of the battery is grounded at 5 and is connected to one lead 6 of a multiple-way electric plug 7 mounted near the rear bumper of the towing vehicle.

The other side of the battery is connected by a lead to a voltage controlling rheostat 8 connected in turn to a lead 9 of the multiple-way plug 7. The hot, or ungrounded, side of the battery 2 is likewise connected through a lead 9a with multiple-way plug 7. The other side of the battery is connected through stop light switch 10 to another lead of multiple-way plug 7.

Note from FIG. 1 that control rheostat 8 can be mounted on the steering column of tow vehicle 1 and can have a manual operating lever 12. Optionally, the rheostat 8 can be operated by linkage 13 connected to the foot brake of the tow vehicle so that operation of the foot brake simultaneously applies the trailer brakes to substantially the same degree as the tow car brakes.

Turning to the trailer, the numeral 14 indicates generally a multiple-way electric coupling mounted at the front end of the trailer and adapted to be complementary to and to plug into coupling 7 at the rear end of the towing vehicle 1. It will be understood that a flexible length of electric cable will be associated with either or both of couplings 7 and 14 so as to allow for turning movement between the trailer and the towing vehicle. The house trailer itself is indicated as a whole by the numeral 15, and as best seen in FIG. 4, the house trailer body is connected through springs 16 with one or more, often two non-rotary axles 17 which rotatably support pneumatically tired wheels 18 at their ends.

Mounted on the underside of the trailer frame above an axle 17 is the brake control or operating mechanism indicated as a whole by the numeral 19. The mechanism 19 is a combination of a reversible constant speed electric motor 20 and a master cylinder assembly 21.

As better seen in schematic detail in FIG. 6, the brake control or operating mechanism 19 includes master cylinder 21 having a brake fluid storage area 22, piston 23, piston rod 24, conduit 25 extending to the trailer brakes, and an associated control cylinder 26 connected by a conduit 27 with the master cylinder. The control cylinder 26 has a piston 28 connected to a piston rod 29.

The piston 23 of the master cylinder 21 is moved to and from braking position by the electric motor 20 which has a worm 30 mounted on its shaft and driving a worm gear 31 positioned between thrust bearings 32 and internally threaded to engage with the screw 33 formed on piston rod 24. Thus, driving the motor 20 forward or reverse moves the piston 23 towards or from brake applying position.

In order to control the operation of the motor 20, a control solenoid 34 is provided having a plunger or movable portion 34a normally positioned to the left in FIG. 6 by a tension spring 35 to zero or inoperative position.

The plunger 34a carries a switch element 44. The solenoid 34 is energized by leads 36 connected to coupling 14 connected to coupling 7 in turn connecting through rheostat 8 with battery 2. Positioning the rheostat 8 to a selected setting thus positions solenoid 34, plunger 34a and switch element 44 to a selected setting or tending to move them to a selected setting thereby tensioning spring 35.

Electric leads 37 extend from coupling 14 to supply electric current from battery 2 to the electric motor 20. Normally a relay 38 is provided in the leads 37 to connect and disconnect the heavier amperage current flowing to the motor and to reverse or stop the motor. The relay 38 is controlled by switch means 39 comprising contacts 40 and 41 mounted in spaced and insulated relation on piston rod 29 and respectively connected by flexible electric leads 42 and 43 to oppositely energize relay 38. Switch or contact 44 carried on plunger 34a is positioned between contacts 40 and 41 and is flexibly but electrically connected to ground and coupling 14 by lead 45. Electric lead 46 extends from coupling 14 to the stop lights 47 on the trailer.

Figure 5:
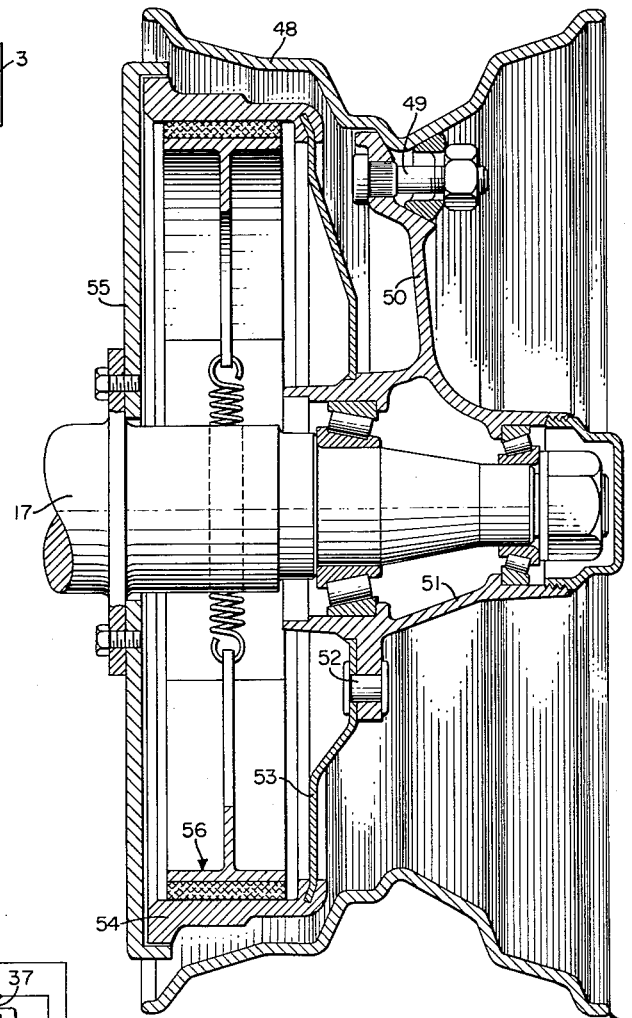
FIG. 5 is a diametric cross-sectional view through the wheel, brake and brake drum combination of the invention.
Figure 3:
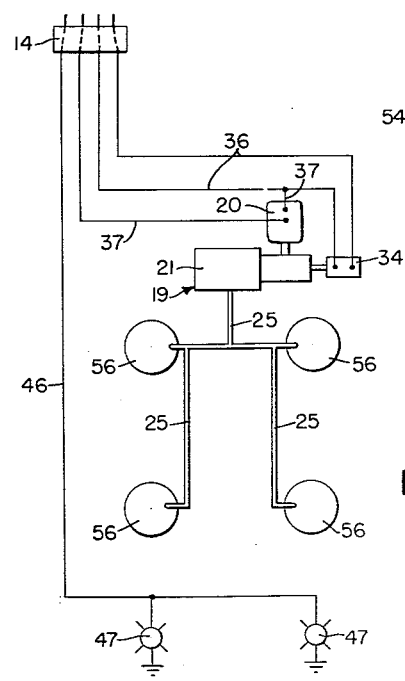
FIG. 3 is a schematic wiring diagram of the house trailer brake and stop light controls.

Each of the wheels 18 of the house trailer comprises, as shown in FIG. 5, a rolled metal drop center rim 48 removably secured by bolts 49 to the ends of a plurality of radial spokes 50, for example five, of a cast metal wheel 51 rotatably journalled on the end of the axle 17. Secured to the hub of the wheel 51, as by rivets 52, is a stamped metal brake drum head 53 to the periphery of which is secured, as by a casting operation, a cast metal brake drum 54.

Secured to the axle 17 is a torque flange and dust cover plate 55, and mounted between the brake drum head 53 and the torque flange 55 and inside of the brake drum 54 is a hydraulic brake unit, usually of a conventional automobile type, indicated as a whole by the numeral 56, and adapted to expand brake shoes out radially against the inner periphery of the brake drum 54 upon the application of hydraulic pressure to the brake unit 56. The hydraulic brakes 56 on each wheel 18 are actuated through hydraulic pressure lines 25 extending from the master cylinder 21 to each wheel brake.

It is believed that the operation of the apparatus will be understood from the foregoing description. Suffice it to say here that a house trailer equipped in accord with the apparatus herein described can be mechanically coupled to any conventional now existing electrically equipped towing vehicle, and with the multi-way coupling 14 of the house trailer being plugged into the coupling 7 of the towing vehicle. Thereafter during the operation of the towing vehicle the trailer brakes 56 are electrically actuated by manually moving the control handle 12 of rheostat 8 to apply a controlled voltage to the solenoid 34. This moves plunger 34a to the right in FIG. 6 to tension spring 35 and to bring contact 44 into engagement with contact 41 to operate relay 38 to energize motor 20 to drive screw 33 and move piston 23 rapidly in brake pressure applying direction. If control handle 12 is thrown to brake fully applied position then solenoid 34 is fully energized and as contact 41 tends to move away from contact 44 this contact continues to follow contact 41 to keep the motor 20 energized until the brake pressure has built up to substantially full pressure. As this occurs the pressure flowing through conduit 27 into control cylinder 26 gradually moves piston 28 to the right (in FIG. 6) finally breaking contact 41 from contact 44 to move relay 38 to neutral position and stop motor 20. The brakes are thus maintained in full pressure application.

Upon return movement of control handle 12 to zero brake position solenoid 34 is deenergized and spring 35 moves contact 44 into engagement with contact 40 to oppositely operate relay 38 and reverse the motor 20 to return master cylinder piston 23 to initial position finally breaking contact 40 from contact 44 as return spring 28a returns control piston 28 to initial position as the pressure in master cylinder 21 drops. This stops the motor 20 with relay 38 in neutral or stop position.

In exactly the same manner any desired degree of braking pressure can be applied to the brakes 56 under the control of the operating handle 12 or the brake foot pedal of the towing vehicle. It will be understood that the system operates very rapidly so that there is a minimum of lag time between the operation of control handle 12 and the full pressure application of the brakes, as for example, a fraction of a second. In this connection it will be recognized that the clearances of the brake parts and the displacement of the brake system is small so that operative times are kept to the minimum. The application of the brakes operates the stop lights, as will be understood.

Of course, with linkage 13 connected between the foot brake of the towing vehicle and the rheostat 8 it is possible to operate the trailer brakes concurrently with the brakes of the towing vehicle and substantially to the same degree. The release of the brakes of the towing vehicle or the return of the arm 12 to its no brake position results in the release of the house trailer brakes.

The combination described has been found to effect a more positive and higher force braking action than with known electric house trailer brakes, and to be considerably less expensive than such electric brakes. Moreover, the combination is less expensive than the installation of fluid pressure tank and related systems on the house trailer, and the invention adapts itself to the provision of a complete package for house trailer manufacturers of trailer axles, wheels, tires, brakes, and electrically operated actuators.

While a certain representative embodiment and details have been shown for the purpose of illustrating the invention, it will be apparent to those skilled in this art that various changes and modifications may be made therein without departing from the spirit or scope of the invention.

What is claimed is:

1. In combination, a towing vehicle, an electric power source on the vehicle, a house trailer connected to the towing vehicle, hydraulic brakes on the house trailer, a master cylinder carried by the house trailer and connected to the hydraulic brakes, a reversible, constant speed electric motor on the house trailer, means connected to and operated by the motor for moving the piston of the master cylinder to and from braking position, electric leads from the towing vehicle to supply electric current from the power source to the motor, solenoid means on the house trailer, a movable portion in the solenoid means, a switch element carried by the movable portion, a rheostat brake control on the towing vehicle, electric leads connecting the power source through the rheostat to the solenoid means whereby the position of the movable portion of the solenoid means and the switch element are controlled by the rheostat, a hydraulic control cylinder connected to the output of the master cylinder, a piston in the control cylinder, a piston rod connected to the piston, and a pair of spaced switch members on the piston rod and straddling the switch element, said switch members and switch element being connected in the electric leads to the motor so that the build-up of pressure in the master cylinder moves the piston in the control cylinder in a direction the same as the action of the movable portion of the solenoid means to thereby connect the motor in forward, stop, or reverse direction in response to the position of the rheostat brake control.

2. In combination, a towing vehicle, an electric power source on the vehicle, a house trailer connected to the towing vehicle, hydraulic brakes on the house trailer, a master cylinder carried by the house trailer and connected to the hydraulic brakes, a reversible constant speed electric motor on the house trailer, means connected to and operated by the motor for moving the piston of the master cylinder to and from braking position, electric leads from the towing vehicle to supply electric current from the power source to the motor, solenoid means on the house trailer, a rheostat brake control on the towing vehicle, electric leads connecting the power source through the rheostat to the solenoid means, a hydraulic control cylinder connected to the output of the master cylinder, a piston in the control cylinder so that the build-up of pressure in the master cylinder moves the piston in the control cylinder in a direction the same as the action of the solenoid means, and a pair of spaced switch means mounted between the piston on the control cylinder and the solenoid means and operated by relative movement of the control cylinder and solenoid means for connecting the motor to the power source in forward, reverse and stop positions.

3. In combination, a towing vehicle, an electric power source, a trailer connected to the towing vehicle, hydraulic brakes on the trailer, a master cylinder carried by the trailer and connected to the hydraulic brakes, a reversible electric motor on the trailer, means connected to and operated by the motor for moving the piston of the master cylinder to and from braking position, electric leads to supply electric current from the power source to the motor, solenoid means on the trailer, a movable plunger in the solenoid means, a rheostat brake control on the towing vehicle, electric leads connecting the power source through the rheostat to the solenoid means, a hydraulic control cylinder connected to the output of the master cylinder, a piston in the control cylinder, a piston rod on the piston, and switch means positioned between the piston rod on the control cylinder and the plunger on the solenoid means for connecting the motor with the power source to drive it in brake applying direction upon the passage of electric current to the solenoid means and for connecting the motor in reversed direction to drive it in brake releasing direction upon the termination of the passage of electric current to the solenoid means, there being a spacing between the switch means to provide for stopping the motor in either brake applied or brake released position, the plunger on the solenoid means and the piston rod on the piston of the control cylinder being positioned for parallel movement and with such piston rod and plunger both moving in the same direction upon increased pressure in the control cylinder and upon actuation of the solenoid.

4. In combination, a wheeled towing vehicle, a trailer connected to the towing vehicle, wheels on the trailer, hydraulic brakes on the trailer wheels, a master cylinder on the trailer having its output connected to operate the hydraulic brakes, an electric motor on the trailer connected to operate the master cylinder, electric power means for operating the motor, a rheostat brake control on the towing vehicle, solenoid means on the trailer, electric leads connecting the power means through the rheostat brake control to the solenoid means, a movable plunger on the solenoid means, pressure responsive means connected to the output of the master cylinder, and switch means including a pair of spaced contacts responsive to the position of the pressure responsive means and the plunger of the solenoid means for connecting the electric power means to the motor to drive it in brake applying direction, to stop it in brake applied position, to drive it in brake releasing direction, and to stop it in brake released position.

5. In combination, a towing vehicle, an electric power source on the vehicle, a house trailer connected to the towing vehicle, hydraulic brakes on the house trailer, a master cylinder carried by the house trailer and connected to the hydraulic brakes, a reversible, constant speed electric motor on the house trailer, means connected to and operated by the motor for moving the piston of the master cylinder to and from braking position, electric leads from the towing vehicle to supply electric current from the power source to the motor, solenoid means on the house trailer, a controllable movable portion in the solenoid means, a switch element carried by the movable portion, a rheostat brake control on the towing vehicle, electric leads connecting the power source through the rheostat to the solenoid means whereby the position of the movable portion of the solenoid means and the switch element thereon are controlled by the rheostat, a hydraulic control cylinder connected to the output of the master cylinder, a piston in the control cylinder, a piston rod connected to the piston, and a pair of spaced switch members on the piston rod and straddling the switch element, said switch members and switch element being connected in the electric leads to the motor to thereby actuate the motor in forward, stop, or reverse direction in response to the position of the rheostat brake control, the piston rod of the control cylinder and movable portion of the solenoid being positioned for parallel movement, energization of the solenoid moving its movable portion in the same direction as increase in pressure in the control cylinder moves the piston rod operatively connected thereto to bring the switch element into engagement with one switch member for motor actuation in a forward direction, the movable portion of the solenoid having limited movement by energization thereof whereby the switch element will follow said one switch member on movement thereof initially on brake actuation but will be ultimately separated therefrom to terminate motor actuation, release of the solenoid bringing the switch element into engagement with the other switch member for reverse motor actuation.

6. In combination, a towing vehicle, an electric power source on the vehicle, a house trailer connected to the towing vehicle, hydraulic brakes on the house trailer, a master cylinder carried by the house trailer and connected to the hydraulic brakes, a reversible, constant speed electric motor on the house trailer, means connected to and operated by the motor for moving the piston of the master cylinder to and from braking position, electric leads from the towing vehicle to supply electric current from the power source to the motor, solenoid means on the house trailer, a movable portion in the solenoid means, a switch element carried by the movable portion, a rheostat brake control on the towing vehicle, electric leads connecting the power source through the rheostat to the solenoid means whereby the position of the movable portion of the solenoid means and the switch element are controlled by the rheostat, a hydraulic control cylinder connected to the output of the master cylinder, a piston in the control cylinder, a piston rod connected to the piston, and a pair of spaced switch members on the piston rod and straddling the switch element, said switch members and switch element being connected in the electric leads to the motor to thereby actuate the motor in forward, stop, or reverse direction in response to the position of the rheostat brake control and its control of the solenoid means, the piston rod of the control cylinder and movable portion of the solenoid being positioned for parallel movement.

References Cited in the file of this patent

UNITED STATES PATENTS

| | | |
|---|---|---|
| 1,804,257 | Greenley | May 5, 1931 |
| 1,896,963 | Leventis | Feb. 7, 1933 |
| 2,039,509 | Adams | May 5, 1936 |
| 2,169,668 | Thomas | Aug. 15, 1939 |
| 2,190,120 | Kohler | Feb. 13, 1940 |